United States Patent

Hedley et al.

[11] Patent Number: 5,996,737
[45] Date of Patent: Dec. 7, 1999

[54] ACCESS DEVICE

[75] Inventors: Robert Ian Hedley, Milbrodale via Singleton; Christopher Nash Whybin, Banxton, both of Australia

[73] Assignee: Justoy Pty Ltd, Australia

[21] Appl. No.: 09/246,313

[22] Filed: Feb. 8, 1999

[30] Foreign Application Priority Data

Feb. 10, 1998 [AU] Australia ................................. 1750/98

[51] Int. Cl.[6] ....................................................... E06C 5/22
[52] U.S. Cl. .............................. 182/127; 182/84; 182/86; 280/166
[58] Field of Search ................................. 182/84, 83, 85, 182/66, 91, 97, 88, 127; 280/166

[56] References Cited

U.S. PATENT DOCUMENTS

| | | | |
|---|---|---|---|
| 3,601,220 | 8/1971 | Saucier | 182/84 |
| 4,971,168 | 11/1990 | Stanescu | 182/84 |
| 5,799,962 | 9/1998 | Barnhart | 182/84 |

*Primary Examiner*—Alvin Chin-Shue
*Attorney, Agent, or Firm*—Cesari and McKenna, LLP

[57] ABSTRACT

An access device (1) for providing access between a lower level and an upper level. The device (1) includes a platform member (2), a ladder member (3) and a rotating actuator (4). The platform (2) and the ladder (3) are movable between an access position (FIG. 1) wherein the ladder (3) is positioned downwardly and the platform (2) is horizontal, and, a storage position (FIG. 3), in which the ladder (3) is positioned upwards and the platform (2) is vertical. In a first step, the actuator (4) rotates the ladder through about a 90° angle to an intermediate position (FIG. 2) at which time the ladder (3) engages with the platform (2). Then, in a second step, the ladder (3) and platform (2) cooperatively rotate between the intermediate position (FIG. 2) and the stored position (FIG. 3).

6 Claims, 8 Drawing Sheets

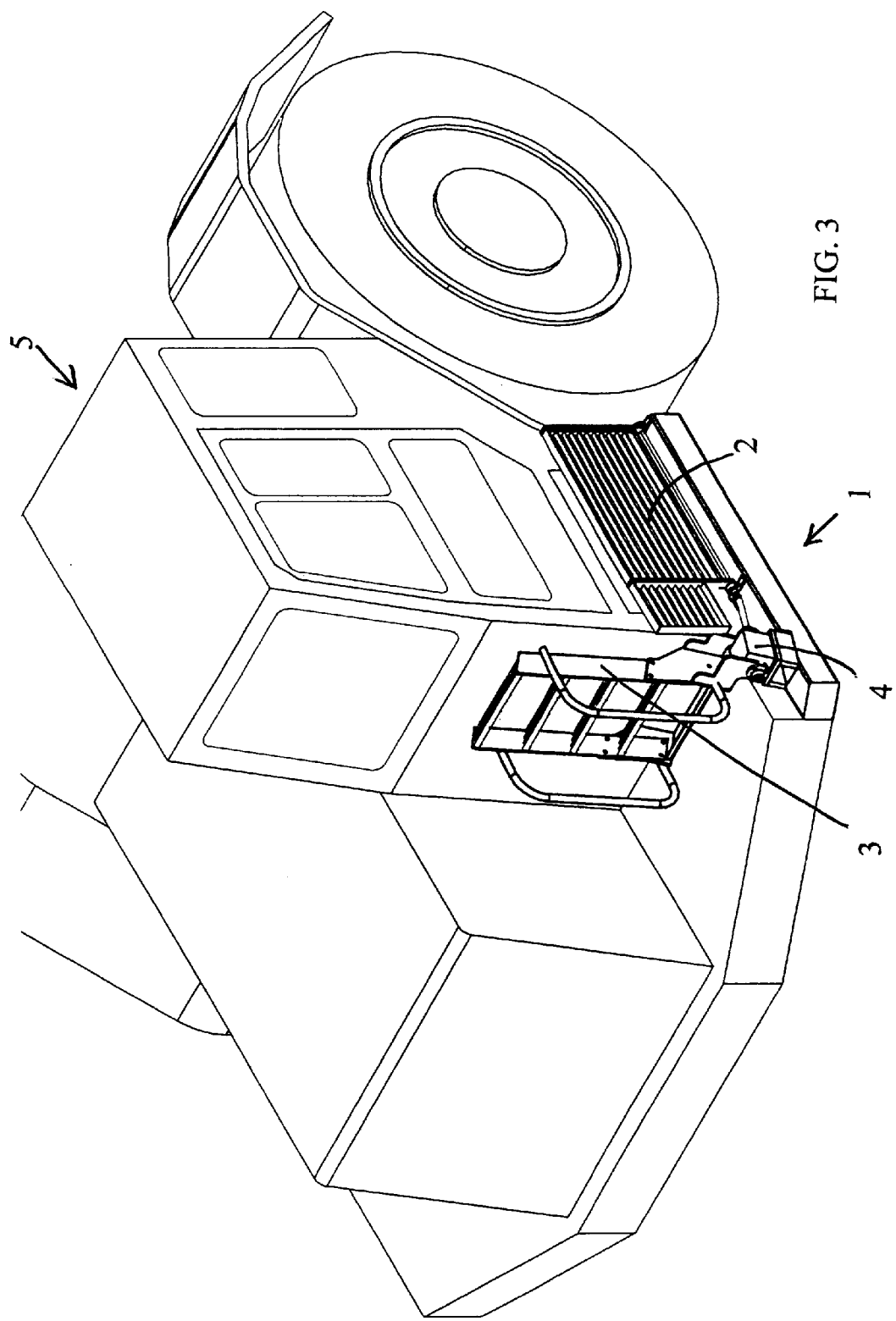

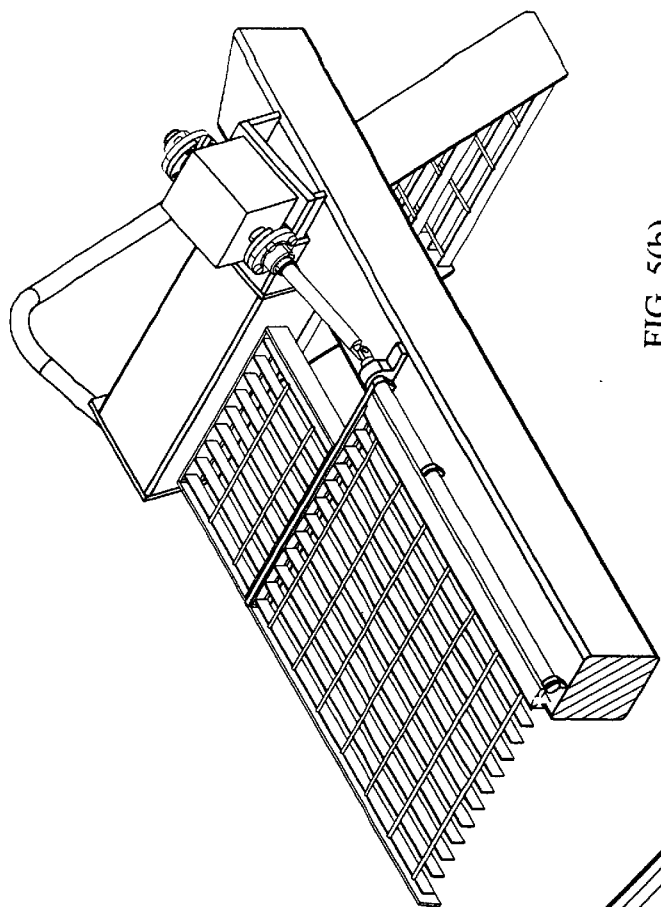
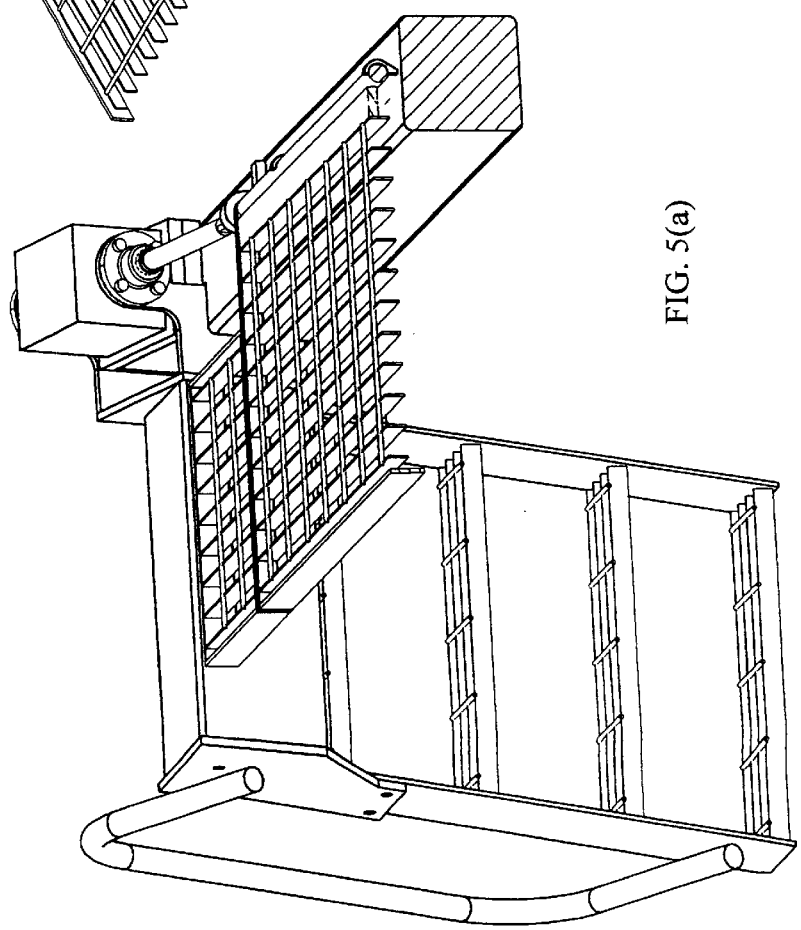
FIG. 5(b)
FIG. 5(a)

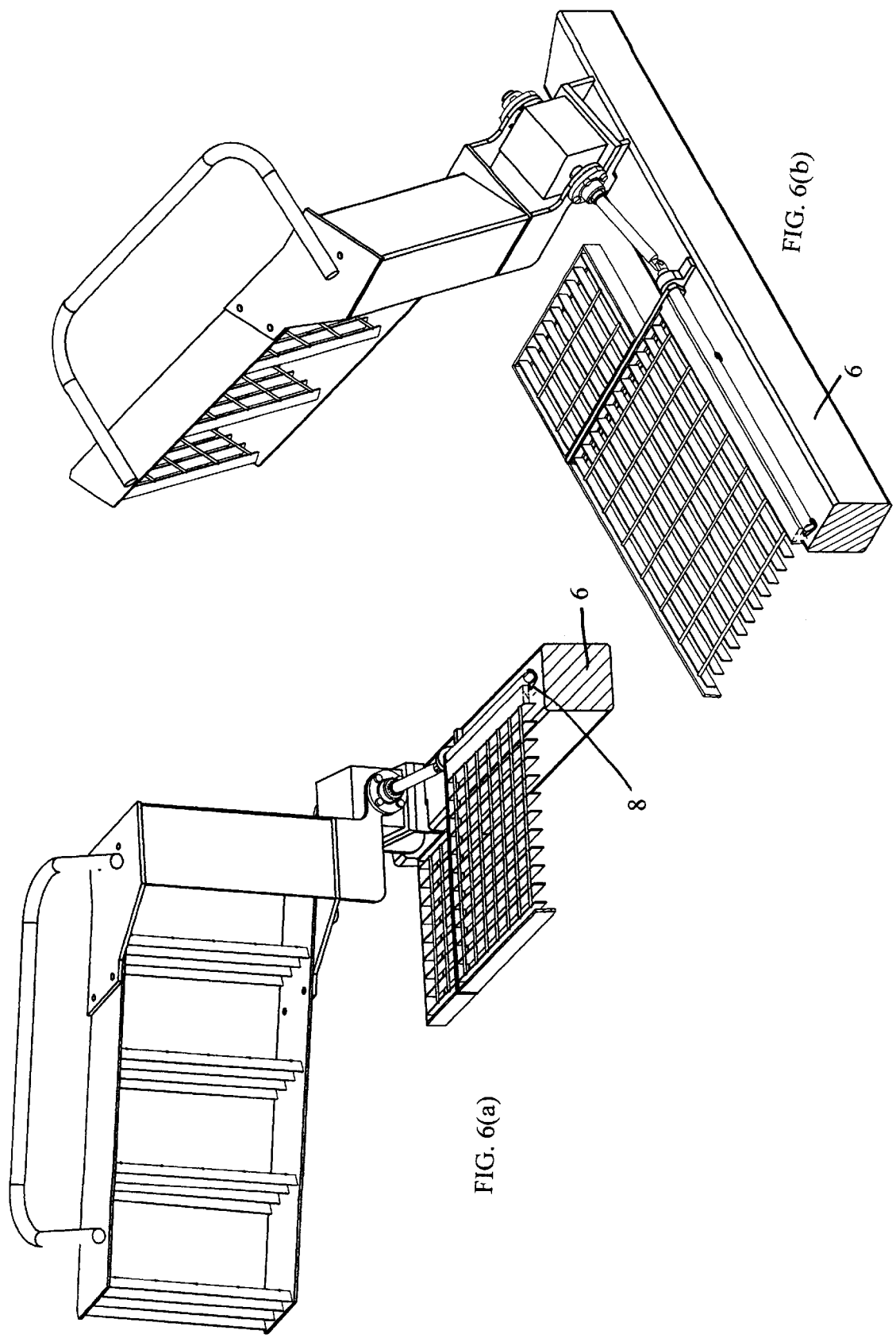

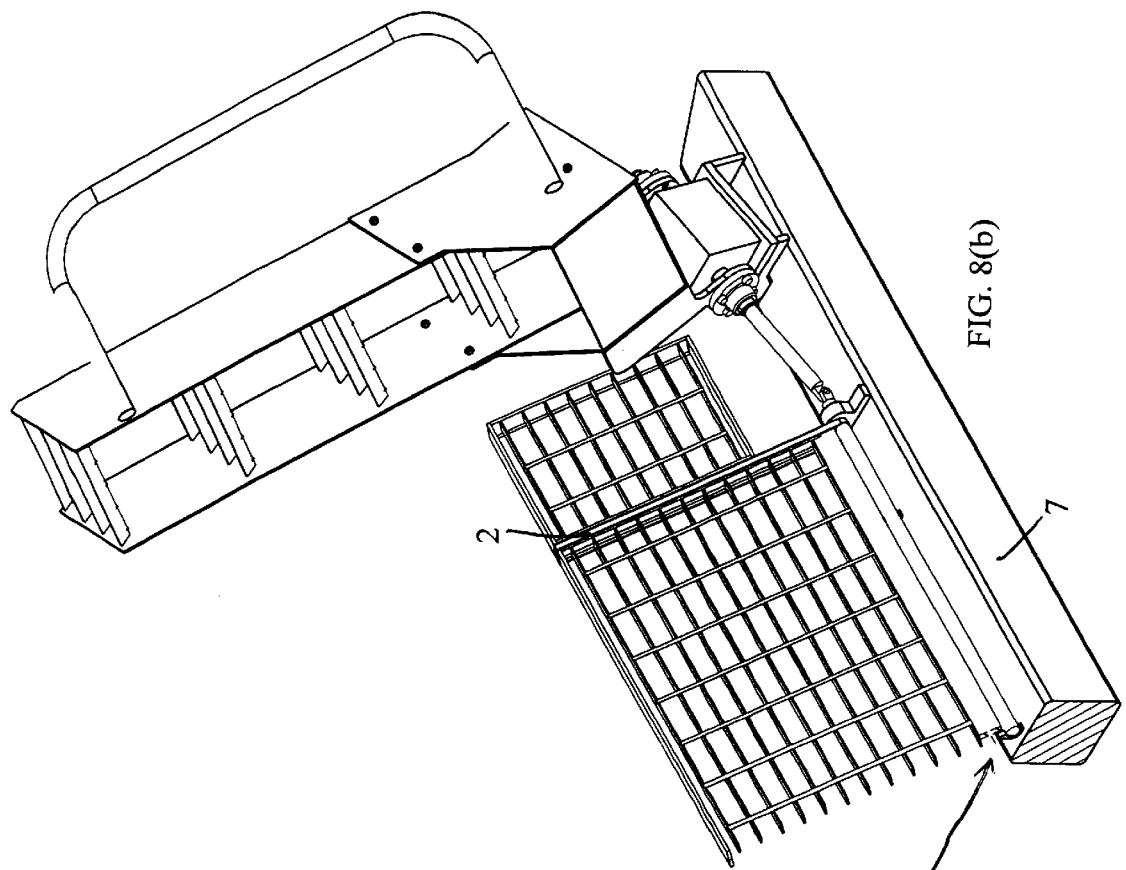
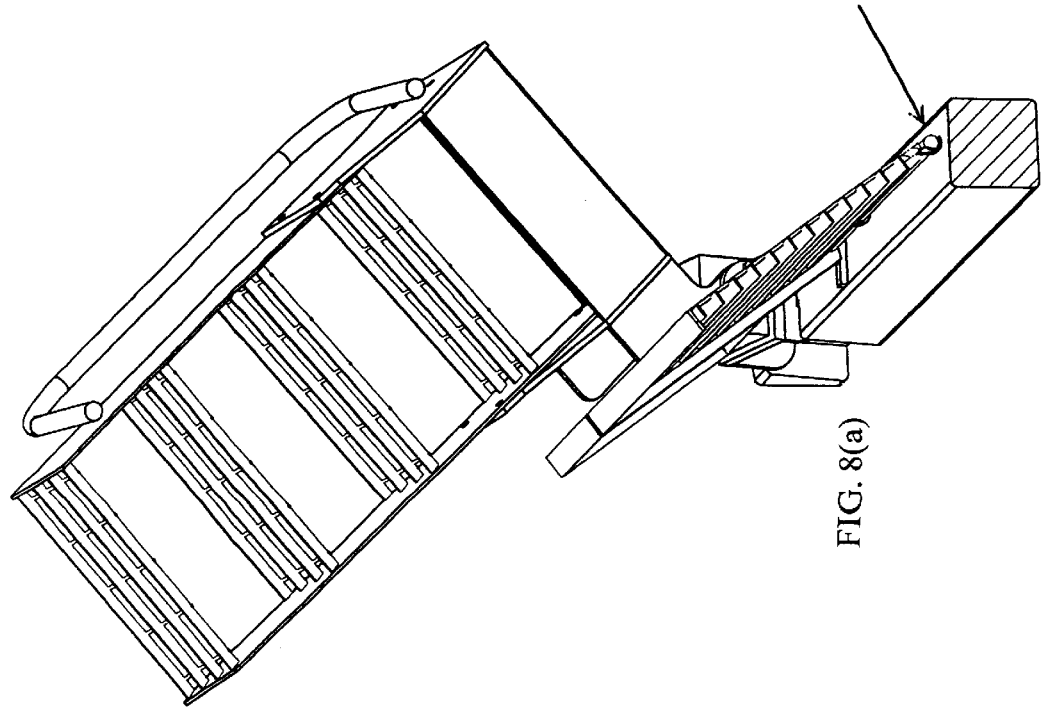

ACCESS DEVICE

FIELD OF THE INVENTION

The present invention relates to an access device, incorporating a ladder or steps, which provides access between a lower and upper surface such as a substrate surface, and the elevated surface of a vehicle. The invention is particularly useful on earthmoving, mining, or like vehicles. The present invention, in particular, relates to an access device which is moveable between an access position and a storage position, wherein, in the storage position, the device retracts such that it is unlikely to interfere with normal operation of the vehicle.

BACKGROUND AND RELATED ART

A variety of different access device configurations for removably or retractably providing an access member between operable and storage positions, are currently known. Some such devices are disclosed in the Applicant's Australian Patent No. 672706 and Australian Application No. 48282/97. Each of these devices described provides for access between a lower level and an upper level, whereby the device is pivotably moveable from a stable lower position to a stable upper position.

Each of these devices also provides for hand rails, predetermined angles of inclination of the ladder, etc., as may be desired for ease of use, or as may be required by various safety regulations, whilst still providing a totally retractable device, which is not likely to interfere with normal operation of the vehicle.

SUMMARY OF THE INVENTION

The present invention seeks to provide an access device which may be used in alternative to the aforementioned devices, which overcome certain disadvantages of prior art access devices.

The present invention also seeks to provide an access device which is conveniently raised and lowered taking up minimal space in the storage position, and which is provided in an operable position at an convenient angle, which complies with relevant local safety standards.

In one broad form, the present invention provides an access device for providing access between a lower level and an upper level, including a platform member, a ladder member, and, actuating means;

whereby said platform member and said ladder member are movable between an access position, in which said ladder member is substantially downwardly inclined and said platform member is substantially horizontally disposed, and a stowed position, in which said ladder member is substantially upwardly inclined approximately 180° relative to its access position and said platform member is substantially vertically disposed approximately 90° relative to its access position and said stored position, whereby, in a first-step, said actuating means rotates said ladder member through approximately a 90° angle between the access position and an intermediate position in which said ladder member extends substantially outwardly and engages with said platform member, and, in a second step, said, ladder member and said platform member cooperatively rotate through a further 90° angle between said intermediate position and said stowed position.

Preferably, said cooperative rotation of said platform member with said ladder member is effected by means of a support plate of said ladder member sliding against and therefore lifting/lowering said platform.

Also preferably, said platform is supported in said access position in a substantially horizontal disposition by means of support lugs.

Preferably, said rotary member is angularly disposed relative to the axis of rotation of said platform.

Also preferably, in said access position, said ladder member is inclined at between 60° and 75°, and perhaps most preferably at 62°, relative to a substantially horizontal substrate surface.

Preferably, said device is installed on a vehicle, such as an earthmoving, mining or like vehicle.

BRIEF DESCRIPTION OF THE DRAWINGS

The present invention will become more fully understood from the following detailed description of a preferred but non-limiting embodiment thereof, described in connection with the accompanying drawings, wherein:

FIG. 3 shows the access device, installed on a vehicle in its stowed position;

FIGS. 5(a) and 5(b) are views of the device in the access position, as per FIGS. 1 and 4(a), but from different viewing angles;

FIGS. 6(a) and 6(b) are views of the device half way between the access position and the stowed position, as per FIGS. 2 and 4(b), but from different viewing angles;

DETAILED DESCRIPTION OF PREFERRED EMBODIMENTS

Throughout the drawings, like numerals will be used to identify similar features, except where expressly otherwise indicated.

Figure 1:
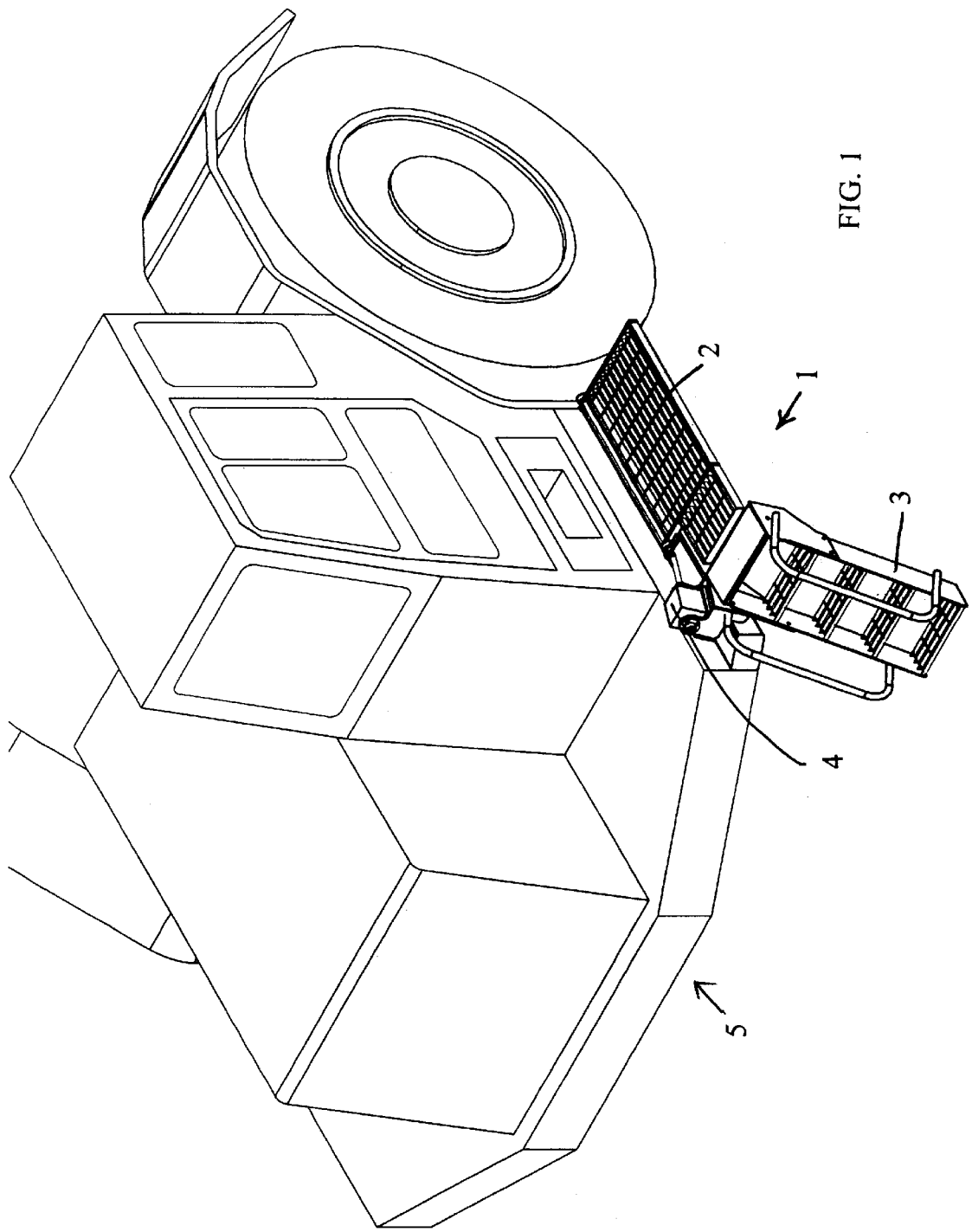
FIG. 1 shows the access device of the present invention, installed on a vehicle, in its access position.
Figure 2:
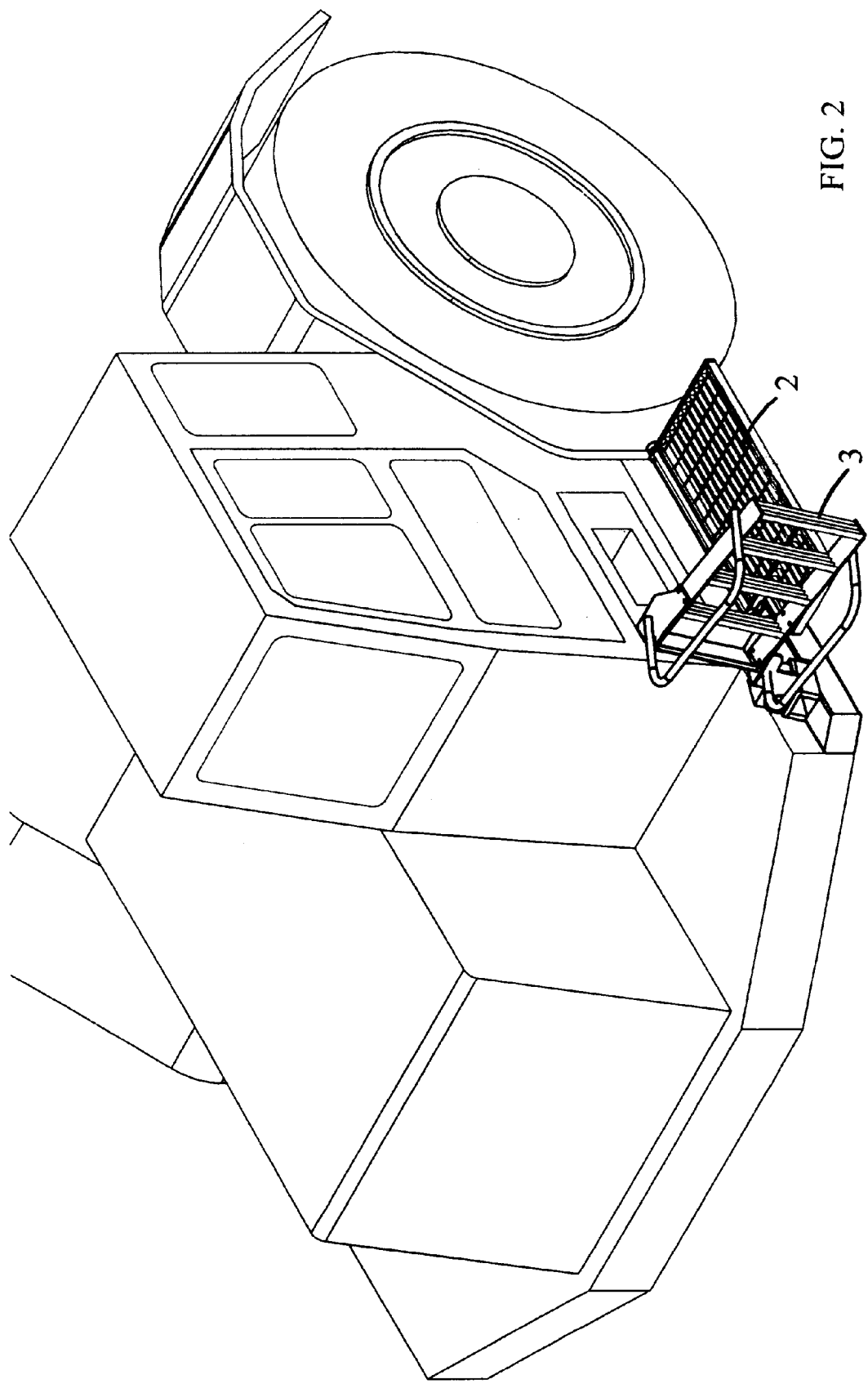
FIG. 2 shows the access device, installed on a vehicle, half way between its access position and its stowed position.

As best illustrated in FIGS. 1, 2 and 3, the access device in accordance with the present invention may be adapted to a vehicle such as an earthmoving or mining vehicle. The present invention provides an access device, generally designated by the numeral 1, which includes a platform member 2, a ladder member 3, and, a rotary actuator 4. As shown in FIGS. 1, 2 and 3, the access device 1 may be installed at an appropriate position on the side of a vehicle 5, and may be moved between an access position shown in FIG. 1, and a stowed position shown in FIG. 3.

Referring initially to FIG. 1, it can be seen that, in the access position, the ladder member is substantially downwardly inclined, and, the platform member is substantially horizontally disposed. The angular disposition of the ladder member may be varied according to certain requirements, safety regulations, etc., but most preferably, the ladder member would be inclined at between 60° and 75°, with the optimal angle at approximately 62°. This facilitates the ease of ascending/descending the ladder by a person to/from the platform 2, for entry into the cab of the vehicle 5.

Referring now to FIG. 3 which illustrates the storage position, it can be seen that the ladder member is substantially upwardly inclined approximately 180° relative to its access position of FIG. 1, and that the platform member is substantially vertically disposed at approximately 90° relative to its access position. In the position illustrated in FIG. 3, it will be appreciated that the access device does not protrude from the vehicle perimeter at all, such that there can be no chance of interference during operation of the vehicle 5, during its earthmoving, mining, or other operations. In the storage position of FIG. 3, the platform neatly sits alongside the cabin of the vehicle 5, and the ladder member 3 neatly sits in front of the cabin of vehicle 5.

Movement of the ladder member 3 and platform member 2, is effected by operation of a rotary actuator 4 from any convenient location, such as within the cabin or vehicle 5, or, via a remote control, etc.

During operation of the rotating actuator 4, tire platform member 2 and the ladder member 3 are moved in essentially a two step process, with the intermediate step being shown in FIG. 2. In the intermediate step of FIG. 2, the platform member is positioned substantially horizontally, and the ladder member 3 extends substantially outwardly. In the position shown in FIG. 2, and depending upon in which direction a movement is being effected the ladder member and platform member become disengaged/engaged. That is, for example, in moving the access device from the position shown in FIG. 1 (i.e. the access position) to the position shown in FIG. 2 (i.e. the storage position), only the ladder member is rotated through approximately a 90° angle, to the position shown in FIG. 2, at which point it cooperatively engages the platform member 2, such that both the platform member 2 and the ladder 3, together rotate through a further 90° angle to the position shown in FIG. 3.

A similar process occurs during movement of the access device from the position shown in FIG. 3 (i.e. the storage position), through the position shown in FIG. 2, to the position shown in FIG. 1 (i.e. the access position). That is, during the first step of the movement, the ladder 3 is cooperatively engaged with platform 2, such that the platform 2 is lowered to the position of FIG. 3 and then, after disengagement of the platform 2 from the ladder 3, the ladder 3 continues its movement to the position shown in FIG. 1. It will be appreciated therefore that there is no sudden movement or dropping of the platform 2 during this operation, but rather, the platform 2 is cooperatively lowered with ladder 3.

Further details of the component features of the invention are shown in the remaining of the drawings.

Figure 4C:
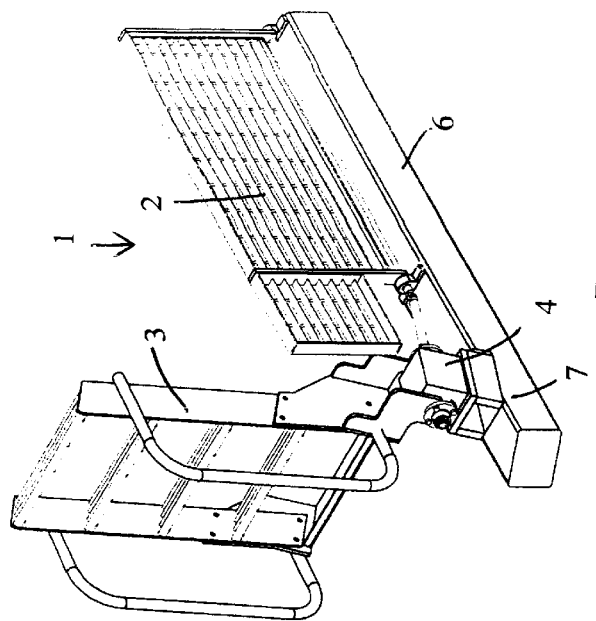
FIGS. 4(a), 4(b) and 4(c) show the access device alone (i.e. without the vehicle) in the access position, half way between the access position and the stowed position, and, in the stowed position, respectively.
Figure 4B:
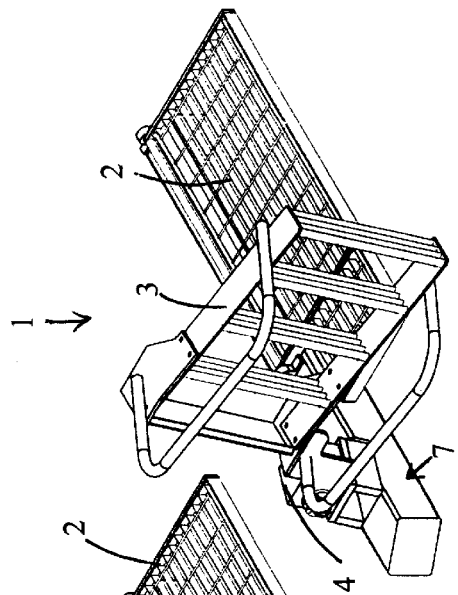
Figure 4A:
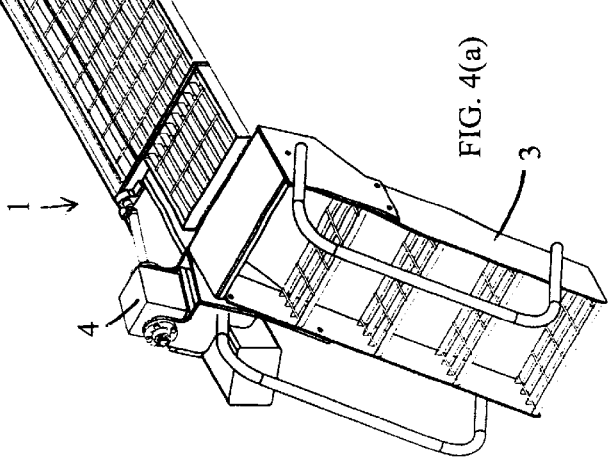

In particular, FIG. 4 illustrates, in FIGS. 4(a), 4(b) and 4(c), respectively, the access device alone, i.e. without the vehicle, in the three positions shown in FIGS. 1, 2 and 3, respectively. It should be noted that the beam or support member 6 may form part of the member 5, or, if appropriate, the beam or support member 6 can be adapted to the side of the vehicle 5. As will be seen, a recessed section 7, may taper upwards and outwards the locate and support the ladder member in the lowest position.

Figure 7B:
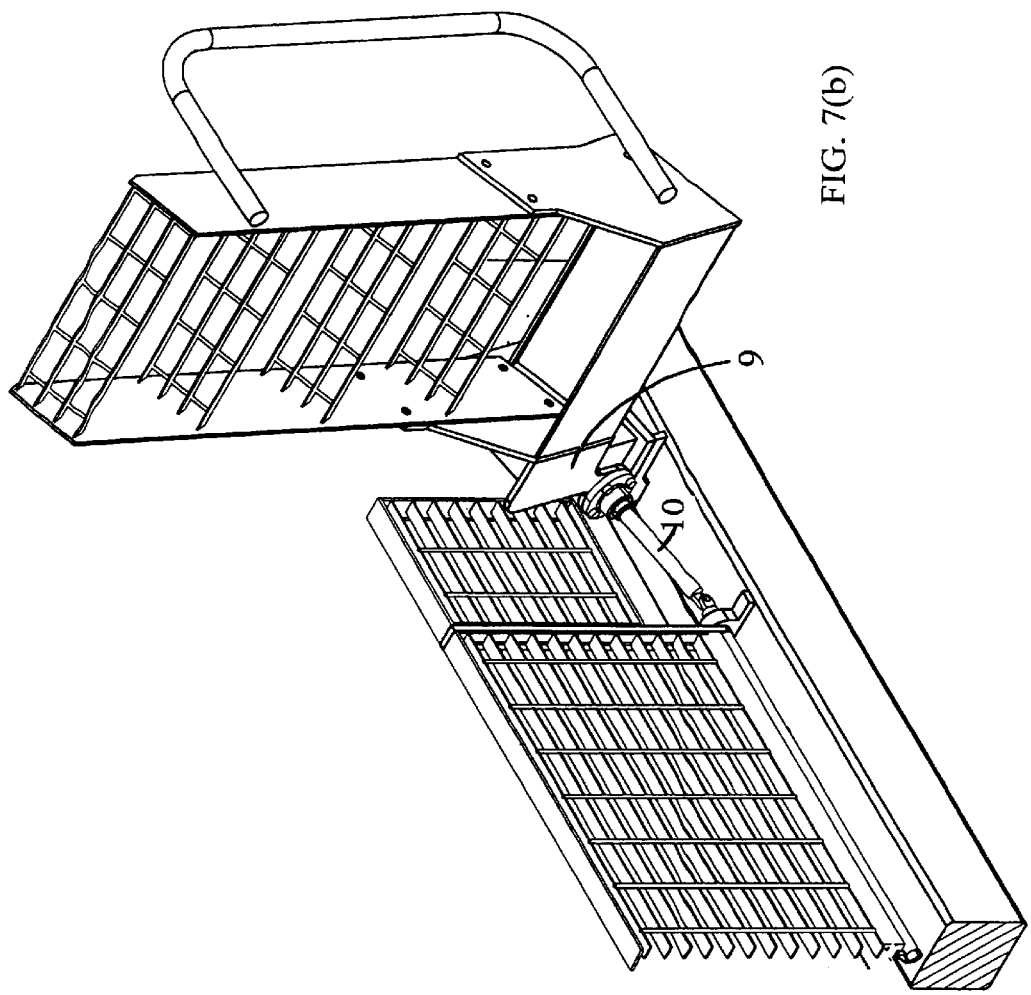
FIGS. 7(a) and 7(b) are views of the device in the stowed position, as per FIGS. 3 and 4(c), but from different viewing angles; and, FIG. 8 details, in FIGS. 8(a) and 8(b), views of the device between the half way position of FIG. 6 and the fully stowed position of FIG. 7, from different viewing angles.
Figure 7A:
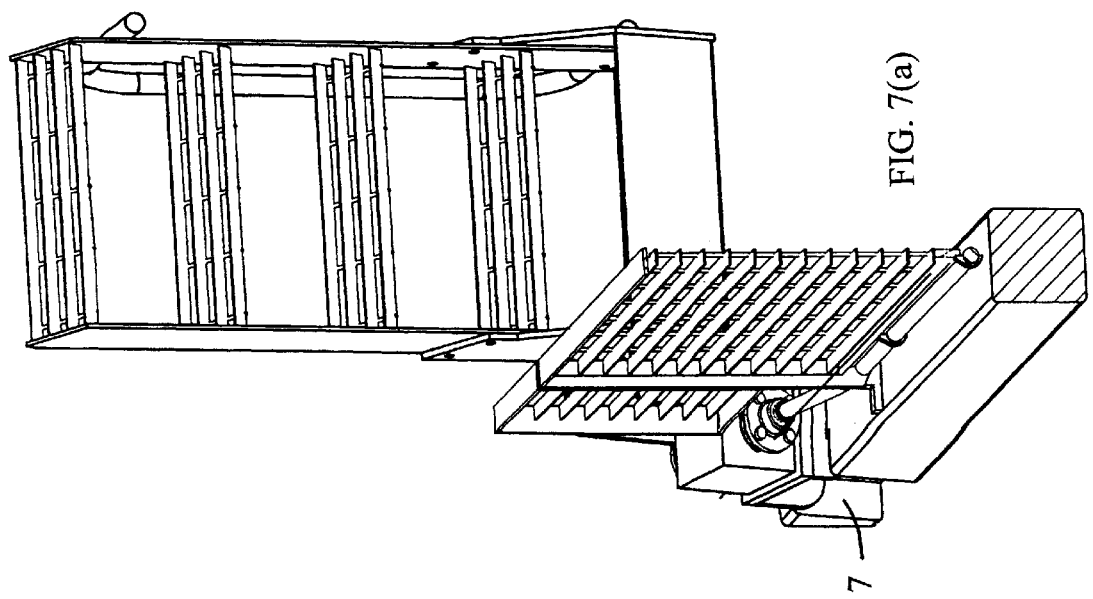

FIGS. 5, 6, 7 and 8 illustrate further views of the access device of the present invention, also without the vehicle shown. FIGS. 5, 6 and 7 illustrate similar views to those shown in FIGS. 1, 2 and 3, respectively, but from different angles, such that various details of the components may be viewed, whilst FIG. 8 illustrates an additional intermediate position between the intermediate step of FIG. 6, and the fully stored position of FIG. 7, such that it can be seen how the cooperative engagement between the ladder member 3 and the platform member 2 is effected during movement of the rotary actuator.

Referring to FIG. 6, which shows the position halfway between the stored and the access positions, it can be seen that the platform rests on stops 8 on the support member 6, whilst the ladder lugs and drive bar continue to travel through a further 90° angle. At this position, the engagement/disengagement of the platform with the ladder occurs, such that, for example, during lowering of the ladder, the ladder then clears the platform to continue its movement through the additional 90° to the access position of FIG. 1.

Referring now to FIG. 7, the cut-away section 7 may again be viewed. The purpose of this cut-away section 7 being to locate and support the ladder in the access position. FIG. 7(b) perhaps best illustrates the ladder in contact with the platform to ensure that the platform travels down with the ladder rather than suddenly dropping. This is effected by means of a support plate 9 which carries the rotating drive shaft 10 and locates in the cut-away section 7.

Referring now to FIG. 8, which illustrates the position of the ladder and platform a quarter of the way between the stored and access position, during the lowering movement, it can again be identified how the support plate 9 continues to slide on the platform 2, to ensure that the platform continues to travel down against the lift lugs 8. The lugs may be welded to the bar 7 to engage under the side of the platform 2.

It will therefore be appreciated that the present invention provides an access device which is particularly useful for installation on the side of a vehicle, such as an earthmoving or mining vehicle, where large clearance under a vehicle is required. Provision of such a ladder will allow for easy access of an operator to the vehicle, but also for complete retraction of the ladder out of the way of any earthmoving or mining operations.

It will be understood that there are other applications for the device other than on a vehicle.

Whilst a particular embodiment of this access device has been hereinbefore described, it will be appreciated that numerous variations, alterations and additions, to such an access device, will be envisaged by persons skilled in the art. All such modifications should be considered to fall within the scope of the invention as broadly hereinbefore described and as claimed hereinafter.

We claim:

1. An access device for providing access between a lower level and an upper level, including a platform member, a ladder member, and, actuating means;

whereby said platform member and said ladder member are movable between an access position, in which said ladder member is substantially downwardly inclined and said platform member is substantially horizontally disposed, and a stowed position, in which said ladder member is substantially upwardly inclined approximately 180° relative to its access position and said platform member is substantially vertically disposed approximately 90° relative to its access position, whereby, in a first-step, said actuating means rotates said ladder member through approximately a 90° angle between the access position and an intermediate position in which said ladder member extends substantially outwardly and engages with said platform member, and, in a second step, said, ladder member and said platform member cooperatively rotate through a further 90° angle between said intermediate position and said stowed position.

2. An access device as claimed in claim 1, wherein, said cooperative rotation of said platform member with said ladder member is effected by means of a support plate of said ladder member sliding against and therefore lifting/lowering said platform.

3. An access device as claimed in claim 1 or 2, wherein said platform is supported in said access position in a substantially horizontal disposition by means of support lugs.

4. An access device as claimed in claim 1 or 2, wherein said rotary member is angularly disposed relative to the axis of rotation of said platform.

5. An access device as claimed in claim 1 or 2, wherein in said access position, said ladder member is inclined at between 60° and 75°, and perhaps most preferably, at 62° relative to a substantially horizontal substrate surface.

6. An access device as claimed in claim 1 or 2, wherein said device is installed on a vehicle, such as an earthmoving, mining or like vehicle.

* * * * *